United States Patent [19]

Li

[11] 4,074,038

[45] Feb. 14, 1978

[54] ACRYLONITRILE-STYRENE-INDENE INTERPOLYMERS

[75] Inventor: George S. Li, Aurora, Ohio

[73] Assignee: The Standard Oil Company, Cleveland, Ohio

[21] Appl. No.: 753,920

[22] Filed: Dec. 23, 1976

[51] Int. Cl.² ........................................... C08F 244/00
[52] U.S. Cl. .................................. 526/280; 526/248; 526/267; 526/268
[58] Field of Search .............. 526/248, 267, 268, 280, 526/342

[56] References Cited

U.S. PATENT DOCUMENTS

| 3,926,871 | 12/1975 | Hensley | 526/267 |
| 3,926,926 | 12/1975 | Li et al. | 526/267 |
| 3,997,709 | 12/1976 | Aziz et al. | 526/268 |

Primary Examiner—Harry Wong, Jr.
Attorney, Agent, or Firm—John F. Jones; Larry W. Evans

[57] ABSTRACT

Thermoplastic polymeric compositions having improved softening temperatures, high strengths and gas barrier properties are composed of an olefinically unsaturated nitrile, such as acrylonitrile, a vinyl aromatic monomer, such as styrene, and indene.

8 Claims, No Drawings

ACRYLONITRILE-STYRENE-INDENE INTERPOLYMERS

The present invention relates to novel polymeric compositions which have low permeability to gases, improved softening temperatures and good optical properties, and more particularly pertains to polymers having improved physical properties which are composed of an olefinically unsaturated nitrile, a vinyl aromatic monomer and indene, and to a process for preparing them.

The copolymers of styrene and acrylonitrile are well known in the art. The polymers of the present invention are superior in many physical properties to the prior art copolymers of styrene and acrylonitrile.

The novel polymeric products of the present invention are prepared by polymerizing an olefinically unsaturated nitrile, such as acrylonitrile, a vinyl aromatic monomer, such as styrene, and indene.

The olefinically unsaturated nitriles useful in this invention are the alpha, beta-olefinically unsaturated mononitriles having the structure

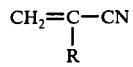

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The preferred nitrile is acrylonitrile.

The vinyl aromatic monomers useful in this invention include styrene, alpha-methyl styrene, the vinyl toluenes, the vinyl xylenes, and the like. Most preferred is styrene.

Indene (1-H-indene) and coumarone (2,3-benzofuran) and mixtures are useful. Most preferred is indene.

The polymeric compositions of this invention can be prepared by any of the known general techniques of polymerization, including the bulk polymerization, solution polymerization, and emulsion or suspension polymerization techniques by batch, continuous or intermittent addition of the monomers and other components. The preferred method is emulsion or suspension polymerization in an aqueous medium. The polymerization is preferably carried out in an aqueous medium in the presence of an emulsifier or suspending agent at a temperature of from about 0 to 100° C in the substantial absence of molecular oxygen.

The preferred polymeric compositions embodied herein are those resulting from the polymerization of (A) about 25 to 50% by weight of at least one nitrile having the structure

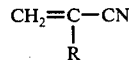

wherein R has the foregoing designation, (B) from 30 to 70% by weight of styrene, and (C) from 5 to 20% by weight of indene wherein the given percentages of (A), (B) and (C) are based on the combined weights of (A), (B) and (C).

More specifically, the present invention can be illustrated in the polymerization of a mixture of acrylonitrile, styrene, and indene to produce a product having superior physical properties to a similarly prepared acrylonitrile-styrene copolymer. The polymeric products of this invention are useful thermoplastics which can be utilized in making molded articles including bottles, films and sheets for packaging solids and liquids.

In the following illustrative examples, the amounts of ingredients are expressed in parts by weight unless otherwise specified.

Examples

A. A terpolymer of a weight ratio of 70:25:5 styrene:acrylonitrile:indene was prepared by emulsion polymerization using the following ingredients:

| Ingredient | Parts |
| --- | --- |
| styrene | 70 |
| acrylonitrile | 25 |
| indene | 5 |
| water | 250 |
| Gafac RE-610 emulsifier* | 2.5 |
| n-dodecyl mercaptan | 0.05 |
| $K_2S_2O_8$ | 0.3 |

*A mixture of $R\text{-}O\text{-}(CH_2CH_2O\text{-})_n PO_3M_2$ and $[R\text{-}O\text{-}(CH_2CH_2O\text{-})_n]_2 PO_2M$ wherein n is a number from 1 to 40, R is an alkyl or alkaryl group, and M is hydrogen, ammonia or an alkali metal, sold by GAF Corporation.

The polymerization was carried out with stirring under a nitrogen atmosphere for 16 hours at 60° C. The resulting polymer was isolated by coagulation, washing and drying. Some of the dried resin was pressed into 66–69 mil discs at 165° to 170° C under 4000 psi for 10 minutes. The discs were found to have an 87% light transmission, a yellowness index of 9.0 and haze of 12. The ASTM heat-distortion temperature of the resin was 100° C (264 psi). This resin had an intrinsic viscosity of 1.22 (measured at 25° C on a 0.5 percent chloroform solution). This resin was found to have the following properties: flexural strength (ASTM D-790) 15.2 × $10^3$ psi, flexural modulus (ASTM D-790) 4.84 × $10^5$ psi and tensile strength (ASTM D-638) 8.37 × $10^3$ psi.

B. The procedure of A above was repeated except that a weight ratio of 50:25:25 of styrene:acrylonitrile:indene was used to form a resin which is outside the scope of this invention. The resulting resin in disc form was found to have a 66% light transmission, 32 yellowness index and 83 haze. The ASTM heat-distortion temperature (264 psi) of the resin was 85° C. This resin had an intrinsic viscosity of 0.5. This resin was found to have the following properties: flexural strength (ASTM D-790) 4.07 × $10^3$ psi, flexural modulus (ASTM D-790) 4.01 × $10^5$ psi and tensile strength (ASTM D-638) 3.07 × $10^3$ psi.

C. The procedure of A above was repeated except that a weight ratio of 70:30 styrene:acrylonitrile was used to produce a resin which is outside the scope of this invention. Discs of the resin were found to have an 85% light transmission, 19 yellowness index and 13 haze. The ASTM heat-distortion temperature (264 psi) of the resin was 99° C. This resin was found to have the following properties: flexural strength (ASTM D-790) 6.51 × $10^3$ psi, flexural modulus (ASTM D-790) 4.83 × $10^5$ psi and tensile strength (ASTM D-638) 7.06 × $10^3$ psi.

D. The procedure of A above was repeated except that a weight ratio of 65:30:5 styrene:acrylonitrile:indene was used to produce a resin. The resulting resin in disc form was found to have an 87% light transmission, 11 yellowness index and 11 haze. The ASTM heat-distortion temperature (264 psi) of the resin was 102° C.

The dry resin had a Brabender plasticorder torque of 1500 meter grams at 220° C. This resin was found to have the following properties: flexural strength (ASTM D-790) 12.1 × 10³ psi, flexural modulus (ASTM D-790) 4.98 × 10⁵ psi and tensile strength (ASTM D-638) 10.6 × 10³ psi.

E. The procedure in A above was repeated except that a weight ratio of 60:40 styrene:acrylonitrile was used to produce a resin which is outside the scope of this invention. The resulting resin in disc form was found to have an 82% light transmission, 41 yellowness index and 16 haze. The ASTM heat-distortion temperature (264 psi) of the resin was 98° C. This resin was found to have the following properties: flexural strength (ASTM D-790) 13.0 × 10³ psi, flexural modulus (ASTM D-790) 4.62 × 10⁵ psi and tensile strength (ASTM D-638) 10.1 × 10³ psi.

F. The procedure in A above was repeated except that a weight ratio of 55:40:5 styrene:acrylonitrile:indene was used to produce a resin. The resulting resin in disc form was found to have an 85% light transmission, 30 yellowness index and 15 haze. The ASTM heat-distortion temperature (264 psi) of the resin was 103° C. This resin was found to have the following properties: flexural strength (ASTM D-790) 15.2 × 10³ psi, flexural modulus (ASTM D-790) 5.05 × 10⁵ psi and tensile strength (ASTM D-638) 10.7 × 10³ psi.

G. The procedure in A above was repeated except that a weight ratio of 45:40:15 styrene:acrylonitrile:indene was used to produce a resin. The resulting resin in disc form was found to have an 84% light transmission, 12 yellowness index and 17 haze. The ASTM heat-distortion temperature (264 psi) of the resin was 106° C. The dry resin had a Brabender plasticorder torque of 1450 meter grams at 200° C.

H. The procedure in A above was repeated except that a weight ratio of 30:50:20 styrene:acrylonitrile:indene was used to produce a resin. The resulting resin in disc form was found to have an 86% light transmission, 9 yellowness index and 16 haze. The ASTM heat-distortion temperature (264 psi) of the resin was 106° C. The dry resin had a Brabender plasticorder torque of 1350 meter grams at 200° C. This resin was found to have the following properties: flexural strength (ASTM D-790) 11.3 × 10³ psi, flexural modulus (ASTM D-790) 5.19 × 10⁵ psi and tensile strength (ASTM D-638) 8 × 10³ psi.

I claim:

1. A thermoplastic terpolymer composition resulting from the polymerization of
   A. from about 25 to 50% by weight of at least one nitrile having the structure

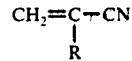

wherein R is hydrogen, a lower alkyl group having from 1 to 4 carbon atoms, or a halogen,
   B. from about 30 to 70% by weight of a vinyl aromatic monomer selected from the group consisting of styrene, alpha-methyl styrene, the vinyl toluenes and the vinyl xylenes, and
   C. from about 5 to 20% by weight of at least one member selected from the group consisting of indene and coumarone wherein the given percentages of (A), (B) and (C) are based on the combined weights of (A), (B) and (C).

2. The composition of claim 1 wherein (A) is acrylonitrile.

3. The composition of claim 2 wherein (B) is styrene.

4. The composition of claim 3 wherein (C) is indene.

5. The process comprising polymerizing in an aqueous medium at a temperature in the range of from 0 to 100° C in the presence of a free-radical initiator and in the substantial absence of molecular oxygen a mixture of
   A. from about 25 to 50% by weight of at least one nitrile having the structure

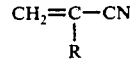

wherein R is hydrogen, a lower alkyl group having from 1 to 4 carbon atoms, or a halogen,
   B. from about 30 to 70% by weight of a vinyl aromatic monomer selected from the group consisting of styrene, alpha-methyl styrene, the vinyl toluenes and the vinyl xylenes, and
   C. from about 5 to 20% by weight of at least one member selected from the group consisting of indene and coumarone wherein the given percentages of (A), (B) and (C) are based on the combined weights of (A), (B) and (C).

6. The process of claim 5 wherein (A) is acrylonitrile.

7. The process of claim 6 wherein (B) is styrene.

8. The process of claim 7 wherein (C) is indene.

* * * * *